Dec. 2, 1952    K. D. DETLING ET AL    2,620,358
CATALYTIC OXIDATION OF OLEFINS IN THE PRESENCE OF CUPROUS OXIDE
Filed Jan. 11, 1949
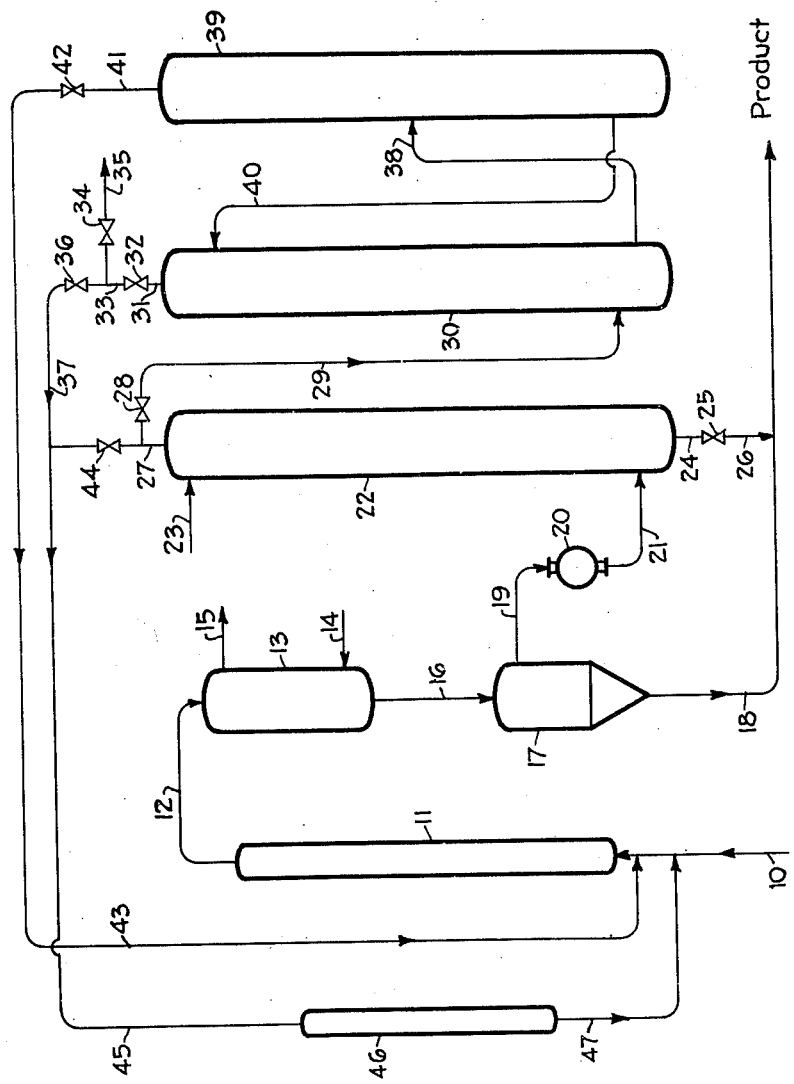
Inventors: Kenneth D. Detling
Vincent P. Guinn
By Their Attorney Patented Dec. 2, 1952

2,620,358

UNITED STATES PATENT OFFICE 2,620,358

CATALYTIC OXIDATION OF OLEFINS IN THE PRESENCE OF CUPROUS OXIDE

Kenneth D. Detling, Berkeley, Calif., and Vincent P. Guinn, Somerville, Mass., assignors to Shell Development Company, San Francisco, Calif., a corporation of Delaware Application January 11, 1949, Serial No. 70,304

11 Claims. (Cl. 260—604)

This invention relates to the process for the oxidation of olefins containing at least three carbon atoms in the presence of a cuprous oxide catalyst to form unsaturated carbonylic compounds of the group consisting of the unsaturated aldehydes and the unsaturated ketones containing an olefinic linkage between two carbon atoms of aliphatic character, one of which is linked directly to the carbon atom of the carbonyl group. The invention relates more particularly to a method of carrying out the oxidation whereby under the hereinafter described circumstances improved utilization of olefin and other advantages, may be obtained. In a preferred embodiment, the present invention relates in particular to a cyclic process of effecting such catalytic oxidation of olefins of the above-defined class.

The catalytic oxidation of olefins containing at least three carbon atoms, in the presence of a cuprous oxide catalyst, is in its broader aspects the subject of U. S. Patent No. 2,451,485, October 19, 1948, to George W. Hearne and Merrill L. Adams. There is disclosed and claimed in said patent the process which comprises contacting an olefin containing at least three carbon atoms with cuprous oxide, or a solid contact mass comprising cuprous oxide, in the presence of oxygen under conditions which favor substantial conversion of the olefin to an unsaturated carbonylic compound of the above-stated group containing the same number of carbon atoms per molecule as the olefin.

Under certain conditions, especially when the aforesaid oxidation process is conducted in a cyclic manner, as by recycling unreacted olefin, a decline in the activity of the catalyst is noted. The rate of the decline may be slow or rapid, depending upon the reaction and other conditions employed. Inspection of the catalyst reveals no apparent change therein during the decline in activity of the catalyst. Frequent to occasional reactivation of the catalyst heretofore has been required, suggesting that during the oxidation of the olefin there occurs an irreversible change in the cuprous oxide catalyst, for example, a change in crystal structure or in oxidation level, which is responsible for the decline in activity. Since the reactivation treatment generally requires interruption of the oxidation process, it is desirable, and for commercial or large-scale operations almost essential, to provide a method of operation which largely obviates necessity for reactivation, since in this way more nearly uninterrupted operations can be attained.

The present invention is based upon the discovery of an improved method of operation whereby under the hereinafter described conditions or circumstances, there may be obtained in the practice of the process of the aforesaid patent results that are substantially improved over those that otherwise would be obtained. As disclosed in the patent, highly favorable conversions to and yields of unsaturated carbonylic compounds of the above-defined group may be obtained by the catalytic oxidation of olefins according to the method disclosed therein. The process of the present invention provides for the obtaining of improved results in such catalytic oxidation of olefins under the particular conditions that may exist when there is contained in the reaction mixture to be supplied to the cuprous oxide catalyst, appreciable amounts of carbon monoxide. The carbon monoxide may at times be contained in one or more of the raw materials, e. g., the olefin as it is received from its source for use in the process, as an incidental impurity thereof. More generally, however, the amounts of carbon monoxide with which the present invention is concerned, are encountered when the aforesaid catalytic process is executed in a cyclic manner, as when excess oxygen and/or excess olefin issuing from the oxidation stage of the process is recycled over either the same or another bed of the cuprous oxide catalyst with an additional supply of either or both of the reactants. The carbon monoxide is formed only in relatively small amounts as a by-product of the catalytic oxidation of olefins in the aforesaid process. However, under such cyclic conditions of operation appreciable quantities of the carbon monoxide may accumulate in the reaction mixture that is being supplied to and in part recirculated over the cuprous oxide catalyst.

Surprisingly, it has been discovered that by removing from the reaction mixture supplied to the cuprous oxide catalyst, all or substantially all of any carbon monoxide that may be present, significantly improved results may be obtained in the practice of the process of the aforesaid patent than otherwise would be obtained. Among the advantages is an increased overall utilization of the olefin, resulting in a desirable economy in the process and in elimination of waste. Aside from the savings thus effected, there results an increased catalyst activity, particularly under the steady-state conditions in a cyclic method of executing the process. A further advantage resides in the minimizing of any possible deteriorating influences which such cyclic operations otherwise might have upon the characteristics of the catalyst.

The processes of the aforesaid patent and of the present invention are applicable generally to the conversion of olefins containing three or more carbon atoms to unsaturated carbonylic compounds of the class consisting of the unsaturated aldehydes and the unsaturated ketones by oxidation in the presence of a solid cuprous oxide catalyst. By the term "olefin" as used herein and in the appended claims is meant the open-chain as well as cyclic olefins. Among the many olefinic compounds which are adapted for use as starting materials, the following may be mentioned: propylene, 1-butene, 2-butene, isobutylene, diisobutylene, 1-pentene, 2-pentene, 3-methyl-1-butene, 2-methyl-2-butene, 1-hexene, 2-hexene, 4-methyl-1-pentene, 3,3-dimethyl-1-butene, 4-methyl-2-pentene, 1-octene, cyclopentene, cyclohexene, 3-methylcyclohexene, etc. These compounds and their various homologs may be substituted in the nucleus and/or in the substituents in various degrees by straight chain alicyclic and/or heterocyclic radicals. The olefins may be treated individually or as mixtures with each other or with the corresponding or other saturated organic compounds. Conversions effectible by the process with which the present invention is concerned include the conversion af propylene to acrolein, isobutylene to methacrolein, alpha- or beta-butylene to methyl vinyl ketone, 1-pentene, or 2-pentene to ethyl vinyl ketone and/or 3-pentene-2-one, 2-methyl-2-butene to methyl isopropenyl ketone, cyclopentene to 2-cyclopentene-1-one, and the like.

The cuprous oxide catalyst preferably is supported on or mixed with a suitable carrier material, such as silica gel, silicon carbide porous aggregates, pumice and the like. Impregnation of the oxide on the carrier may be carried out, for example, by treating the degassed carrier with a concentrated solution of cupric nitrate or chloride or with an ammonium compound comprising copper, as copper ammonium nitrate. The nitrate and ammonium compounds may be decomposed to cuprous oxide by first heating the dried carrier between about 250° C. and 400° C. in a slow stream of air and then reducing the cupric oxide thus formed to cuprous oxide with hydrogen or other suitable reducing agent. Substantially the same procedure is followed in the preparation of the catalyst from the chloride except that repeated oxidation and reduction may be necessary.

In effecting the partial oxidation of the hereindefined class of olefins in the presence of a cuprous oxide catalyst, a reasonable degree of latitude is permissible in the reaction temperature. The reaction temperature, i e., the temperature of the catalyst, preferably is maintained in the range of from about 200° C. to about 450° C. Catalyst temperatures as high as about 600° C. may be employed. The temperature used depends primarily upon the catalyst, the particular olefin being treated, and the correlated conditions of the rate of throughput or contact time, and the ratio of olefin to oxygen. Apparent contact times of from about 0.1 sec. to about 10 sec. generally are satisfactory. The apparent contact time may be defined as the length of time in seconds a unit volume of gas measured under the conditions of reaction is in contact with a unit apparent volume of the catalyst. It may be calculated, for example, from the apparent volume of the catalyst bed, the average temperature of the catalyst, the pressure (if different from atmospheric) and the flow rates of the several components of the reaction mixture. Molar ratios of olefin to oxygen between about 1:1 and 30:1 generally give satisfactory results, ratios from about 2:1 to about 6:1 being preferred. It has been determined that unless the temperature is kept under reasonable control, the oxidation may proceed to the formation of carbon dioxide and water at the expense of the desired product. The temperature may be controlled, for example, by diluting the reaction mixture with steam, by operating with an excess of olefin and/or by using a carrier or supporting material which is a good heat conductor. Also the cuprous oxide, alone or supported on a suitable carrier material, may be used in a dust or "fluidized" form and agitated to dissipate the heat of reaction. The reaction may be effected at pressures either equal to or above or below atmospheric pressures. Usually the process is executed most conveniently at near atmospheric pressure.

When an olefin containing at least three carbon atoms is thus oxidized in the presence of cuprous oxide, carbon monoxide is produced as one of the minor by-products of reaction. The amounts of carbon monoxide which are formed are, in general, not large. For example, in one experiment, propylene, oxygen, and steam were passed into contact with a cuprous oxide catalyst maintained at about 410° C. to 425° C. Under the conditions employed, approximately 65 per cent of the propylene consumed was converted to acrolein, the desired product. About 19 per cent of the propylene consumed was converted to carbon dioxide and about 3 per cent was converted to carbon monoxide. The remainder of the propylene consumed was accounted for by minor amounts of various products of reaction other than those specifically mentioned. In an analogous experiment in which isobutylene was converted to methacrolein, the carbon monoxide formed again accounted for less than 5 per cent of the olefin consumed. It will be appreciated that, depending upon the particular conditions employed, either somewhat larger or somewhat smaller relative amounts of carbon monoxide may be formed in any given instance. In general less than about 10 per cent of the olefin is liable to be converted to carbon monoxide.

It has been found that the carbon monoxide thus formed is a pronounced catalyst poison for the cuprous oxide catalyst and that its presence even in small amounts in the reaction mixture may have a marked effect in reducing the activity of the catalyst. The poisoning effect of carbon monoxide was surprising for the reason that the carbon monoxide is one of the products of the oxidation reaction and hence would not be expected to exert a specific poisoning action upon the catalyst, and because cuprous oxide is known from the work of Bessalow and Kobosev, Acta Physicochimica U. R. S. S., 7, 649 (1937) to be an active catalyst for oxidation of carbon monoxide to carbon dioxide. Carbon dioxide which also is formed as a product of the reaction has been found to have no observable inhibitory reaction, its effects when present in the reaction mixture being essentially those of an inert diluent and hence being generally comparable with those of steam, nitrogen, saturated hydrocarbons, etc., upon the course and/or extent of the reaction. The term "inert gas," unless qualified otherwise, is used to refer severally and collectively to these gaseous materials that function essentially as inert diluents in the reaction mixture.

The inhibitory action of the carbon monoxide upon the catalyst is in part dependent upon the temperature of the catalyst. At catalyst temperatures below about 500° C. the presence in the reaction mixture of as small a proportion as 1 per cent by volume of carbon monoxide may have an appreciable effect in reducing the activity of the catalyst. At higher catalyst temperatures somewhat larger proportions of carbon monoxide may be tolerated without deleterious effects upon the activity of the catalyst. In a cyclic process of oxidizing olefins of the present class in the presence of cuprous oxide, the amount of carbon monoxide formed during any single pass thus may be less than an amount which would undesirably deactivate the catalyst. However, upon recycling of excess reactants and such relatively minor amounts of carbon monoxide, the concentration of carbon monoxide in the reaction mixture could rapidly build up to a value well above that permitting optimum activity of the catalyst. By reducing the proportion of carbon monoxide to excess reactant in the recycle stream, as by removing, or separating, a sufficient portion of the carbon monoxide from the stream, such cyclic operations therefore may be executed with a higher degree of efficiency and with other advantages of the character herein described.

It is desirable to maintain the concentration of carbon monoxide in the gaseous mixture that is supplied to the catalyst less than about 0.5 per cent by volume, and preferably less than about 0.2 per cent by volume. The corresponding amounts of carbon monoxide that may be tolerated in each of the components of the mixture prior to their admixture will, of course, depend upon the relative amount of each component that is furnished to the reactor feed. Whether excessive amounts of carbon monoxide are present in the several components of the feed readily may be calculated in any given instance by those skilled in the art, on the basis of suitable analyses and the make-up schedule that is employed.

Various means and/or methods may be employed for effecting removal of the carbon monoxide, in whole or in sufficient part, that may be associated with one or more of the components of the reactor feed. In its broader concepts, the present invention provides for such removal without limitation according to the specific method that is employed for the purpose. However, in order to enable those skilled in the art more readily to practice the process of the invention, certain specific, preferred methods of effecting the removal of the carbon monoxide will be described in greater detail. Because the advantages of the present invention may be most advantageously realized in a cyclic process of effecting the present oxidation reaction particular reference will be made to such cyclic processes. It will be appreciated, however, that suitable modifications to adapt the method to non-cyclic operations can be made, by those skilled in the art, if desired, in view of the present disclosures of the invention.

In a cyclic process for the oxidation of olefins containing at least three carbon atoms in the presence of cuprous oxide catalyst, the reaction mixture leaving the catalyst ordinarily contains unreacted olefin and/or oxygen which, after separation of the unsaturated carbonylic product of the reaction, may be recirculated with additional reactants and/or diluent gas over the same or another bed of the catalyst. According to the present invention, the stream of excess reactant(s) thus recirculated, is treated so as to separate from the reactant(s) all or substantially all of any carbon monoxide associated therewith, thereby preventing the accumulation of carbon monoxide in the reaction system while at the same time providing maximum utilization of the reactants, particularly the olefin.

It may be noted that whereas venting of a portion of the recycle stream of unreacted reactant(s) conceivably could be employed to prevent build-up of carbon monoxide concentration in the reaction system, the rate of formation of carbon monoxide is such that it frequently could require the venting of a substantially larger amount of unreacted olefin per pass than is reacted per pass to prevent the excessive accumulation of carbon monoxide.

The drawing herewith will illustrate an arrangement of apparatus that is suitable for executing the process of the present invention in certain of its specific embodiments. The drawing is intended to be illustrative only, and for this reason various pieces of accessory equipment, etc., which readily can be supplied by those skilled in the art when desirable or required, have not been shown in the drawing.

In the apparatus illustrated in the drawing, the reaction mixture which comprises the olefin, such as propylene, a diluent gas such as steam, and oxygen or air in suitable proportions is supplied via conduit 10 to the reactor 11 which contains the cuprous oxide catalyst and which is maintained at the desired reaction temperature by internally or externally locating heating means (not shown). The gaseous mixture leaving the reactor is led through conduit 12 to the condenser 13 which may be cooled by water or the like entering and leaving at inlet 14 and outlet 15, respectively. The cooled mixture is led through conduit 16 to the gas separator 17, the liquified portion of the mixture being separated and drawn off through conduit 18 for further treatment for separation and/or purification of the desired product contained therein.

The gaseous portion of the mixture is led from the gas separator 17 through conduit 19 to pump 20 whereby the mixture may be compressed if desired to facilitate subsequent operations, and thence via conduit 21 to an adsorption tower 22 or other suitable means effective for recovering any of the desired carbonylic product of the reaction remaining in the gaseous portion of the mixture. When the carbonylic product is water-soluble, e. g., acrolein, the gases may be scrubbed with water, introduced into the absorption tower via inlet 23 and the resultant solution withdrawn via conduit 24, pressure relief valve 25, and conduit 26, for recovery and/or purification of the carbonylic product thus separated.

After separation of the desired unsaturated carbonylic product of the oxidation, in the foregoing or any other effective manner, the unreacted olefin may be treated so as to separate substantially all of the carbon monoxide that may be associated therewith. The apparatus illustrated in the drawing embodies equipment suitable for effecting such separation by two specific methods either one of which may be employed to the exclusion of the other, or which advantageously may be employed simultaneously.

According to one method of separation, the residual gas leaving the scrubbing tower 22 after separation of the unsaturated carbonylic product, or, in other words, the recycle stream, is passed through conduit 27, valve 28, and conduit 29 to an absorber 30 or other means effective for selectively removing unreacted olefin from the residual gas. In the drawing, the absorber is illustrated as a scrubbing column in which a liquid that is a solvent for the olefin but a non-solvent for carbon monoxide, for example, an organic solvent such as kerosene, gasoline, an ester, a ketone, etc., is intimately contacted with the gaseous mixture. The gases not absorbed thereby and which may comprise nitrogen, oxygen, carbon dioxide, the carbon monoxide, etc., may be vented to the atmosphere through conduit 31, valve 32, conduit 33, valve 34, and vent 35, or they may be passed via conduit 31, valve 32, conduit 33, valve 36, and conduit 37 to the conduit 45 which is referred to again hereinafter. The absorbent liquid containing the absorbed, or dissolved, olefin, is conducted via conduit 38 and suitable pumps (not shown) to the stripping column 39, in which the olefin is separated from the solvent, the solvent being returned to the scrubbing column 30 via conduit 40. The olefin thus recovered and which is substantially devoid of carbon monoxide may be conducted from the stripping column 39 via conduit 41, pressure relief valve 42 and conduits 43 and 10 to reactor 11 and recirculated with fresh reactor feed over the same bed of catalyst, or it may be passed through suitable conduits with fresh feed to a second reactor containing cuprous oxide catalyst.

When the second method of removing carbon monoxide from the excess reactant(s) is employed, all or part of the gas leaving the absorber 22 is conducted through conduit 27, valve 44 and conduit 45 directly to a heated reactor 46 in which there is positioned a bed of a catalyst effective for promoting selective oxidation of carbon monoxide in the presence of an olefin. If the gas leaving the absorber 22 contains insufficient oxygen to react with all of the carbon monoxide, additional oxygen, air, etc., may be added prior to passage through the reactor 46. In the reactor 46, the carbon monoxide is selectively oxidized to carbon dioxide by reaction with the oxygen in contact with the catalyst. After exposure to the catalyst in the reactor, the mixture of gases thereby freed from carbon monoxide may be returned via conduit 47 to the reactor feed supplied to reactor 11 or to the feed of a second reactor.

It has been found that the catalysts of the type known as "Hopcalite" may be employed in reactor 46 to effect the selective oxidation of carbon monoxide in the presence of olefins of the herein defined class. The Hopcalite catalysts may comprise as their principal ingredients from about 35 to about 70 per cent by weight manganese dioxide, from about 10 to about 50 per cent cuprous oxide, and if desired, minor amounts of oxides of other elements, such as of cobalt and silver. One effective catalyst of this type comprises, for example, about 50 per cent manganese dioxide, 30 per cent cuprous oxide, 15 per cent cobaltic oxide, and about 5 per cent silver oxide (see Industrial and Engineering Chemistry, 12, 213–221 (1920)). The silver oxide may be omitted, if desired, without impairing the selectivity of the catalyst as applied in the present process, and with a desirable reduction in cost of the catalyst. The cobalt oxide also may be eliminated, if desired, although the catalyst thus obtained is somewhat less selective and less active when applied in the present process. Other catalysts which may be employed for promoting the selective oxidation of the carbon monoxide include, for example, manganese dioxide, copper chromite, iron oxide, nickel oxide, chromium oxide, and mixtures of the foregoing oxides with each other and/or with other oxides of metals. A preferred catalyst is represented by one composed of from about 35 to about 75 per cent manganese dioxide, from about 20 to about 35 per cent cuprous oxide, and from about 5 to about 30 per cent cobaltic oxide. Suitable catalysts may be prepared by precipitating the oxides from a solution of the nitrates or other soluble salts of the elements, and washing thoroughly and drying the collected precipitate. The catalyst may be supported on a carrier material such as alumina, pumice, kieselguhr, etc., if desired.

The catalyst may be positioned in the reactor 46 in the form of pellets, fragments, lumps, etc., and the recycle stream flowing in conduit 45 passed into contact therewith at a temperature effective for promoting the desired reaction. Temperatures from room temperatures up to 150° C. or higher generally are effective. When the recycle stream is thus treated only negligible oxidation, if any, of the olefin occurs. At temperatures appreciably above 250° C., particularly with the more active catalysts, there is liable to occur excessive oxidation of the olefin; the use of temperatures lower than this therefore is in general desirable. The oxidation of the carbon monoxide in this manner forms carbon dioxide. The carbon dioxide thus formed need not be removed from the mixture of gases prior to their reintroduction to the reactor represented by reactor 11.

It will be appreciated that numerous variations can be made in the construction and operation of the apparatus illustrated in the drawing. For example, either method of removing the carbon monoxide from the recycle stream may be employed to the exclusion of the other; in such cases it is possible to omit from the apparatus those portions not required. It frequently may be particularly advantageous to utilize both of the illustrated methods of removing the carbon monoxide simultaneously. When steam is employed as the diluent gas in the mixture supplied to reactor 11 and air is the source of the oxygen, advantages may be obtained by passing through valve 28 into absorber 30 only the proportion of the recycle stream that contains the inert gas i. e., nitrogen, carbon dioxide, etc., to be vented from the system. When pure oxygen is employed instead of air, it is preferred to recirculate a greater proportion, up to all of the recycle stream via valve 44 and conduit 45 to reactor 46. In this manner, carbon dioxide and other inert, non-condensable gases may be retained in the recycle stream without the accumulation of excessive amounts of carbon monoxide; the amount of inert diluent (e. g., steam) that otherwise would have to be supplied may be reduced accordingly. If, in this latter instance, excessive amounts of carbon dioxide would accumulate in the reaction system, a suitable proportion of the recycle stream may be vented to the atmosphere either directly or with prior separation of the olefin as in scrubbing column 30; or, alternatively, the recycle stream may be treated with an absorbent for carbon dioxide, such as a solid alkali or alkaline material or an aqueous solution of, for example, an organic amine, to remove part or all of the carbon dioxide.

Whereas in the apparatus and method described in the preceding paragraphs liquid absorbent media have been employed for the removal of residual carbonylic products in column 22 and of the olefin in column 30, such liquid media may be replaced in appropriate cases by solid adsorbents or absorbents, such as activated alumina, activated carbon or the like, that are adapted to retain the material to be removed from the gas stream. The retained material may be recovered from the solid adsorbent either intermittently or continuously according to known methods and further treated as desired according to the present process. The illustrated apparatus is particularly suited to the preparation of the lower, relatively volatile unsaturated aldehydes and ketones, such as acrolein, methacrolein, methyl vinyl ketone, and the like. When it is desired to produce higher, less volatile unsaturated aldehydes or ketones, the necessary changes in the system for the separation of the carbonylic product of the process from the reaction mixture readily can be made by those skilled in the art.

Although the foregoing paragraphs and the drawing illustrate certain preferred embodiments of the invention, it will be understood that the invention in its broadest concepts includes other methods of selectively removing the carbon monoxide from the recycle stream. The invention thus includes, instead of selectively oxidizing the carbon monoxide by reaction with molecular oxygen, oxidizing the carbon monoxide by reaction with steam, which may be mixed with the recycle stream, in the presence of iron oxide according to the well-known reaction

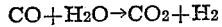
$$CO + H_2O \rightarrow CO_2 + H_2$$

The iron oxide conveniently may be positioned in the heated reactor 46 in place of the catalysts referred to previously, and the recycle stream admixed with steam passed into contact therewith at a suitably elevated temperature, say about 200° C. to 250° C. or higher.

As an illustration of the operation of the present process, a stream of a gaseous mixture of propylene, oxygen, and steam is passed into contact with a solid catalyst composed of cuprous oxide supported on silicon carbide porous aggregates under conditions which favor substantial oxidation of the propylene to acrolein. The mixture leaving the catalyst chamber is cooled to condense the steam and part of the acrolein. The balance of the acrolein is removed by scrubbing the uncondensed gas with water. The residual gas containing excess propylene is continuously recycled and mixed with the feed supplied to the cuprous oxide catalyst. Under the particular conditions of the experiment, but without recycle of the residual gas, approximately 65 per cent of the propylene consumed is converted to acrolein and approximately 80 per cent of the oxygen supplied is consumed. The mixture leaving the cuprous oxide catalyst contains from about 0.1 to about 0.3 per cent by volume of carbon monoxide. When the residual gas mixture containing excess propylene is recycled (with venting to the atmosphere of a minor proportion to eliminate from the system excess carbon dioxide formed during the reaction) with the feed supplied to the cuprous oxide catalyst, but under reaction conditions otherwise the same, a steady state concentration of carbon monoxide in the reaction mixture in contact with the catalyst of about 3 per cent by volume develops. The yield of acrolein decreases slightly but the rate of acrolein formation falls off markedly. The consumption of oxygen applied decreases from the previous value to about 30 per cent, indicating a decrease in the activity of the catalyst upon reintroduction of the gaseous products of the reaction into the reactor feed. If, now, the recycle stream, instead of being passed directly into the catalyst feed, is led at a pressure of about 50 pounds per square inch through a heated reactor in which there is maintained a bed of "Hopcalite" catalyst maintained at, say, 150° C., substantially all of the carbon monoxide in the recycle stream is oxidized to carbon dioxide without significant oxidation of the other materials that are present. Upon introduction of the thus treated recycle stream into the reactor feed supplied to the cuprous oxide catalyst, but under reaction conditions otherwise the same as in the preceding run, the steady state concentration of carbon monoxide in the gaseous mixture in contact with the cuprous oxide catalyst is reduced to and maintained at a value less than about 0.2 per cent by volume. The yield of acrolein remains about the same, but the rate of formation of acrolein is increased from two to three fold and the consumption of oxygen is increased to about 65 per cent of the oxygen applied.

It will be apparent that numerous specific embodiments of the present invention can be made by those skilled in the art within its scope as defined in the appended claims. With this in mind, the foregoing application of the invention is not presented for the purpose of imposing limitations upon the scope of the invention, but, rather, as one illustration of the invention more broadly described and claimed herein.

We claim as our invention:

1. In a process for the production of an unsaturated carbonylic compound of the group consisting of the unsaturated aldehydes and the unsaturated ketones wherein a stream of a gaseous mixture comprising an olefin containing at least three carbon atoms, oxygen, and inert gas is passed into contact with a solid catalyst comprising cuprous oxide under conditions productive of an unsaturated carbonylic compound of said group by oxidation of the olefin, unsaturated carbonylic product is separated from the effluent from the catalyst zone leaving a residual gaseous mixture comprising inert gas, oxygen, carbon monoxide, and unconsumed olefin, which unconsumed olefin is to be passed in admixture with make-up feed to solid catalyst comprising cuprous oxide for oxidation to a further quantity of said unsaturated carbonylic compound, the improvement which comprises passing at least a portion of said residual gaseous mixture, comprising inert gas, oxygen, carbon monoxide, and olefin, to an intermediate oxidation zone wherein the carbon monoxide is selectively oxidized to carbon dioxide without material conversion of the olefin, and passing gaseous effluent from said intermediate oxidation zone, containing oxygen, inert gas, the olefin, and from a substantially reduced amount down to no carbon monoxide, in admixture with make-up feed to solid catalyst comprising cuprous oxide for oxidation to a further quantity of said unsaturated carbonylic compound.

2. The invention defined by claim 1 when the intermediate oxidation zone contains Hopcalite catalyst maintained at about 150° C. for promoting the oxidation of carbon monoxide.

3. The invention defined by claim 1 when the olefin is propylene and the unsaturated carbonylic compound is acrolein.

4. In a process for the production of an unsaturated carbonylic compound of the group consisting of the unsaturated aldehydes and the unsaturated ketones wherein a stream of a gaseous mixture comprising an olefin containing at least three carbon atoms, oxygen, and inert gas consisting essentially of steam is passed into contact with a solid catalyst comprising cuprous oxide under conditions productive of an unsaturated carbonylic compound of said group by oxidation of the olefin, unsaturated carbonylic product is separated from the effluent from the catalyst zone leaving a residual gaseous mixture consisting essentially of unconsumed oxygen and olefin, carbon dioxide, and carbon monoxide, which unconsumed olefin is to be passed in admixture with make-up feed to solid catalyst comprising cuprous oxide for oxidation to a further quantity of said unsaturated carbonylic compound, the improvement which comprises passing said residual gaseous mixture consisting essentially of unconsumed oxygen and olefin, carbon dioxide, and carbon monoxide, to an intermediate oxidation zone wherein the carbon monoxide is selectively oxidized to carbon dioxide without material conversion of the olefin, and passing the gaseous effluent from said intermediate oxidation zone, containing oxygen, the olefin, carbon dioxide, and from a substantially reduced amount down to no carbon monoxide, in admixture with make-up feed to solid catalyst comprising cuprous oxide for oxidation to a further quantity of said unsaturated carbonylic compound.

5. The invention defined by claim 4 when the intermediate oxidation zone contains Hopcalite catalyst maintained at about 150° C. for promoting the oxidation of carbon monoxide.

6. The invention defined by claim 4 when the olefin is propylene and the unsaturated carbonylic compound is acrolein.

7. The invention defined by claim 4 when the intermediate oxidation zone contains an iron oxide catalyst and the carbon monoxide is oxidized in the presence of said catalyst by reaction with water.

8. In a process for the production of an unsaturated carbonylic compound of the group consisting of the unsaturated aldehydes and the unsaturated ketones wherein a stream of a gaseous mixture comprising an olefin containing at least three carbon atoms, air, and added inert gas is passed into contact with a solid catalyst comprising cuprous oxide under conditions productive of an unsaturated carbonylic compound of said group by oxidation of the olefin, unsaturated carbonylic product is separated from the effluent from the catalyst zone leaving a residual gaseous mixture comprising inert gas, oxygen, carbon monoxide, and unconsumed olefin, which unconsumed olefin is to be passed in admixture with make-up feed to solid catalyst comprising cuprous oxide for oxidation to a further quantity of said unsaturated carbonylic compound, the improvement which comprises dividing said residual gas into a plurality of portions, each comprising inert gas, oxygen, carbon monoxide, and olefin, conveying a first portion of said residual gas to an intermediate oxidation zone wherein the carbon monoxide is selectively oxidized to carbon dioxide without material conversion of the olefin, separating olefin from a second portion of said residual gas, and passing gaseous effluent from said intermediate oxidation zone, containing oxygen, inert gas, the olefin and from a substantially reduced amount down to no carbon monoxide, and olefin separated from said second portion of the residual gas, in admixture with make-up feed to solid catalyst comprising cuprous oxide for oxidation to a further quantity of said unsaturated carbonylic compound.

9. The invention defined by claim 8 when the intermediate oxidation zone contains Hopcalite catalyst maintained at about 150° C. for promoting the oxidation of carbon monoxide.

10. The invention defined by claim 8 when the olefin is propylene and the unsaturated carbonylic compound is acrolein.

11. The invention defined by claim 9 when the olefin in said second portion of said residual gas is separated by absorption in and desorption from a liquid hydrocarbon solvent.

KENNETH D. DETLING.
VINCENT P. GUINN.

REFERENCES CITED

The following references are of record in the file of this patent:

UNITED STATES PATENTS

| Number | Name | Date |
|---|---|---|
| 2,451,485 | Hearne et al. | Oct. 19, 1948 |

OTHER REFERENCES

Groggins: "Unit Processes in Organic Synthesis," 3rd ed., 1947, pages 447, 457, McGraw-Hill Book Co.